United States Patent
Halwe et al.

(10) Patent No.: US 11,526,426 B2
(45) Date of Patent: Dec. 13, 2022

(54) MEMORY LEAK DETECTION USING REAL-TIME MEMORY GROWTH PATTERN ANALYSIS

(71) Applicant: Juniper Networks, Inc., Sunnyvale, CA (US)

(72) Inventors: Prateek Halwe, Bangalore (IN); Amit Arora, Bangalore (IN); Harmeet Singh, Bangalore (IN); Rahul Chandra Khali, Bangalore (IN)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 31 days.

(21) Appl. No.: 17/247,903

(22) Filed: Dec. 29, 2020

(65) Prior Publication Data

US 2021/0397536 A1    Dec. 23, 2021

(30) Foreign Application Priority Data

Jun. 22, 2020   (IN) .............................. 202041026176

(51) Int. Cl.
  *G06F 11/36* (2006.01)
  *G06F 11/14* (2006.01)
  *G06F 11/30* (2006.01)

(52) U.S. Cl.
  CPC ........ *G06F 11/366* (2013.01); *G06F 11/1438* (2013.01); *G06F 11/3037* (2013.01); *G06F 11/3075* (2013.01); *G06F 11/3648* (2013.01)

(58) Field of Classification Search
  CPC ............... G06F 11/366; G06F 11/1438; G06F 11/3037; G06F 11/3075
  See application file for complete search history.

(56) References Cited

U.S. PATENT DOCUMENTS

| | | | |
|---|---|---|---|
| 8,397,048 B2 * | 3/2013 | Zachmann | G06F 11/0751 711/170 |
| 2004/0078540 A1 * | 4/2004 | Cirne | G06F 11/362 711/170 |
| 2015/0067405 A1 * | 3/2015 | Hsieh | G06F 11/3452 714/39 |
| 2015/0186644 A1 * | 7/2015 | Komissar | G06F 11/3037 726/22 |
| 2019/0129822 A1 * | 5/2019 | Alam | G06N 3/088 |
| 2019/0213068 A1 * | 7/2019 | Upadhyay | G06F 11/3419 |

* cited by examiner

*Primary Examiner* — Amine Riad
(74) *Attorney, Agent, or Firm* — Shumaker & Sieffert, P.A.

(57) ABSTRACT

The disclosure describes techniques that enable detection of memory leaks of software executing on devices within a computer network. An example network device includes memory and processing circuitry. The processing circuitry monitors a usage of the memory by a software component operating within the network device. The processing circuitry periodically determines a memory growth pattern score for the software component based on the usage of the memory. The processing circuitry also predicts whether the user-level process is experiencing a memory leak based on the memory growth pattern score. The processing circuitry applies confirmation criteria to current memory usage of the software component to confirm that the software component is experiencing the memory leak. When the software component is experiencing the memory leak, the processing circuitry generates an alert.

20 Claims, 7 Drawing Sheets

MEMORY LEAK DETECTION USING REAL-TIME MEMORY GROWTH PATTERN ANALYSIS

This application claims the benefit of IN Provisional Application No. 202041026176 filed Jun. 22, 2020, the entire content of which is herein incorporated by reference.

TECHNICAL FIELD

The disclosure relates to computer networks and, more particularly, to detecting memory leaks within devices of the computer network.

BACKGROUND

A computer network is a collection of interconnected computing devices that can exchange data and share resources. Example network devices include layer two devices that operate within the second layer of the Open Systems Interconnection (OSI) reference model, i.e., the data link layer, and layer three devices that operate within the third layer of the OSI reference model, i.e., the network layer. Network devices within computer networks often include a control unit that provides control plane functionality for the network device and forwarding components for routing or switching data units. In some cases, for example, a network device may include a plurality of packet forwarding engines (PFEs) and a switch fabric that collectively provide a forwarding plane for forwarding network traffic. Network devices provide a platform to execute one or more software applications to facilitate routing packets though the network device. In some situations, one or more software applications may not release unused memory, leading to a "memory leak" in which the device slowly runs out of available memory, leading to instability of the network device and overall network operation.

SUMMARY

In general, the disclosure describes techniques that enable detection of memory leaks of software executing on devices within a computer network. Network devices, such as routers, have a control unit that includes a user space that supports executing software components. One or more of these software components use may not properly manage memory, leading to a memory leak. As describe below, a monitor (sometimes referred to a "monitor daemon") tracks memory usage of the user application executing in the user space to develop a memory growth pattern (mgp) baseline for each application and utilizes the memory growth pattern score to detect usage deviations indicative of memory leak. The monitor daemon may take and/or trigger remedial action to manage the memory leak. In such a manner, the operation of the network device is improved by detecting user applications experiencing memory leaks before the memory leaks cause a deterioration or failure of the network device.

An example network device includes memory and processing circuitry. The processing circuitry monitors a usage of the memory by a software component operating within the network device. The processing circuitry periodically determines a memory growth pattern score for the software component based on the usage of the memory. The processing circuitry also predicts whether the user-level process is experiencing a memory leak based on the memory growth pattern score. The processing circuitry applies confirmation criteria to current memory usage of the software component to confirm that the software component is experiencing the memory leak. When the software component is experiencing the memory leak, the processing circuitry generates an alert.

An example method includes monitoring memory usage for a software component operating within a network device. The method also includes periodically determining a memory growth pattern score for the software component based on the characterization of the memory usage. The method includes identifying whether the software component is experiencing a memory leak based on the memory growth pattern score. Additionally, the method includes applying confirmation criteria to current memory usage of the software component to confirm that the software component is experiencing the memory leak. The method includes, when the software component is experiencing the memory leak, generating an alert.

A computer readable medium comprising instructions that, when executed, cause a network device to monitor memory usage for a software component operating within a network device. The instructions also cause the network device to periodically determine a memory growth pattern score for the software component based on the characterization of the memory usage. The instructions cause the network device to identify whether the software component is experiencing a memory leak based on the memory growth pattern score. The instructions cause the network device to apply confirmation criteria to current memory usage of the software component to confirm that the software component is experiencing the memory leak. Additionally, the instructions cause the network device to, when the software component is experiencing the memory leak, generating an alert.

The details of one or more examples are set forth in the accompanying drawings and the description below. Other features, objects, and advantages will be apparent from the description and drawings, and from the claims.

DETAILED DESCRIPTION

Figure 1:
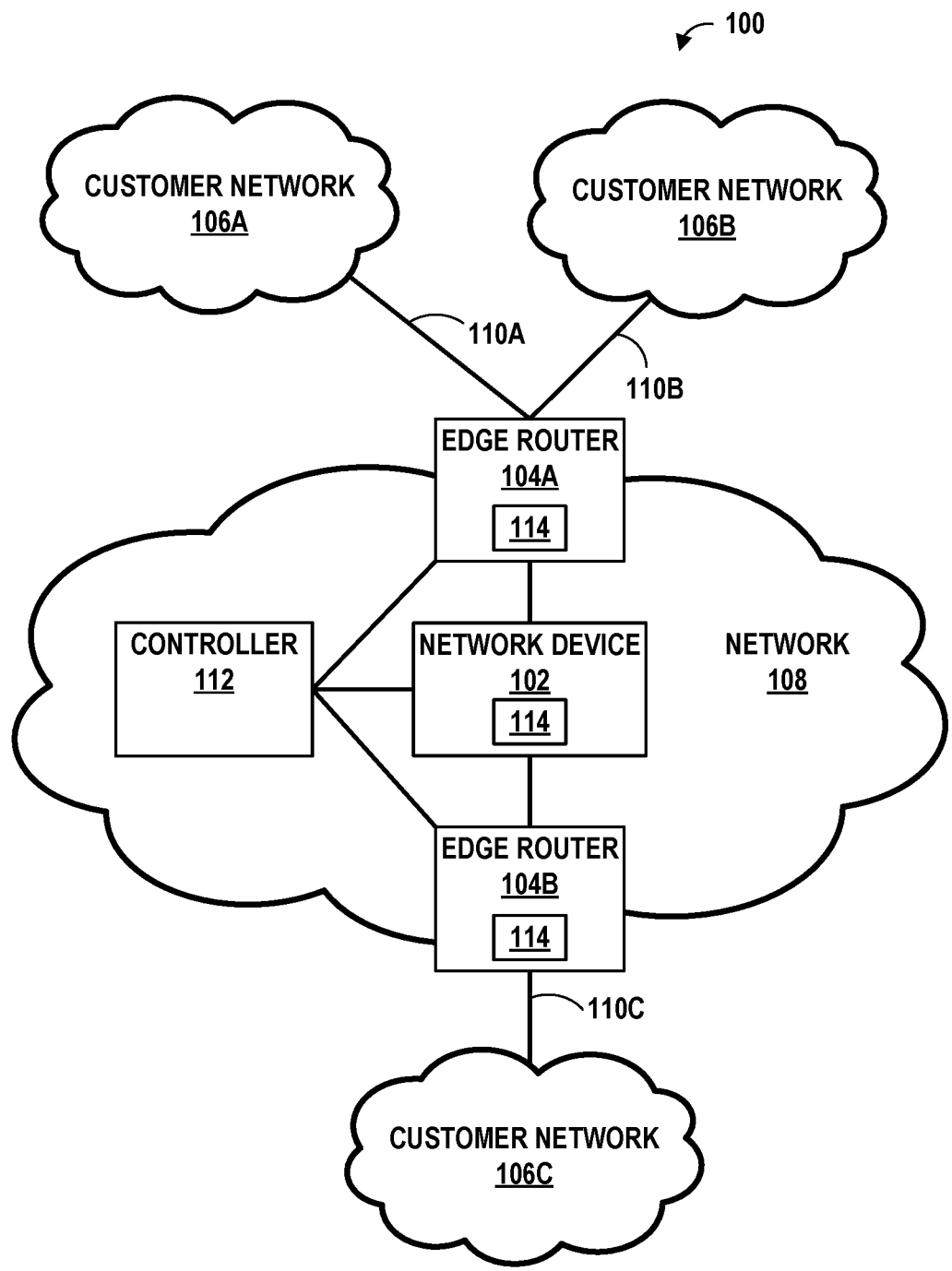
FIG. 1 illustrates a system with network devices operating in accordance with the principles described in this disclosure.

Network devices include various software components (e.g., processes, applications, modules) that execute on the network device to control the operation of the network device. Occasionally, the software applications have memory leaks that overtime consume more and more system memory. Memory leaks may occur, for example, when a software component does not properly release memory temporarily allocated for usage. If left unaddressed, these memory leaks can eventually reduce available memory to an extent that it causes a system failure due to the low available memory. Consequently, the system failure leads to traffic loss by network devices. Memory leaks in network devices are difficult to detect because some software component of the network device may temporarily require an increased amount of system memory to, for example, process an increased amount of network traffic. The techniques described below detect memory leaks to differentiate between genuine temporary increases in memory usage and memory leaks.

As described in more detail below, a monitor (sometimes referred to herein as a "monitor daemon" or "memory monitor") executes in the user space of a network device. The monitor daemon characterizes typical memory usage for applications and, based on patterns that deviate from that typical usage, predict whether an application is experiencing a memory leak. The monitor daemon performs system calls to, for example, the kernel to determine memory usage of user applications executing in the user space to characterize memory usage by each of the applications and detect memory leaks. In the examples described below, the monitor daemon includes a learning engine and a prediction engine.

The learning engine characterizes the typical memory usage of the user applications. For each user application, the learning engine periodically (e.g., daily, every six hours, etc.) and/or aperiodically (e.g., after a router restart, etc.) (i) establishes a baseline virtual memory usage value to reflect the typical memory usage of the application, and (ii) an interval value to reflect expected temporary increases in memory usage. The interval value represents a minimum memory growth needed to increase the memory growth score. For example, a user application may have a baseline virtual memory usage value of 100 megabytes (MB) and a minimum memory growth of 25 MB. That is, the memory daemon may expect the user application typically uses about 100 MB of virtual memory and that during periods of legitimate increased memory usage (e.g., due to typical fluctuations of network traffic), the user application would use about 125 MB of virtual memory.

In some examples, the prediction engine periodically (e.g., hourly, etc.) monitors memory usage to determine whether a user application is experiencing a memory leak by maintaining a memory growth pattern score for the application. The memory growth pattern score tracks the growth pattern of memory usage of the application. As the memory usage of an application increases, the memory growth pattern score associated with the application may increase. Initially, the memory growth pattern baseline is the baseline virtual memory usage of the application. When the memory growth pattern baseline increases by at least the minimum memory growth (e.g., the interval), the memory growth pattern score associated with the application is increase and the memory growth pattern baseline is set to the current virtual memory usage of the application. Thus, while the baseline virtual memory usage is a relatively static value, the memory growth pattern baseline increases as memory usage increases. For example, if, for an application, the baseline virtual memory usage value is 100 MB and the interval is 25 MB, the memory growth pattern score of the application would increase when the application uses, for example, 126 MB of virtual memory and the memory growth pattern baseline would be set to 126 MB. Subsequently, the memory growth pattern score may further increase when the current virtual memory usage of the application is more than 151 MB. In such a manner, when an application has a legitimate requirement for more memory (even above the interval), the memory growth pattern score eventually settles at a steady value. On the other hand, when an application is experiencing a memory leak, the memory growth pattern score continues to grow.

To predict that an application is experiencing a memory leak, the prediction engine maintains multiple ranked lists of the user applications executing on the network device. Each list tracks a different memory usage metric for the applications. For example, the prediction engine may maintain a ranked list of current memory usage for each application, a ranked list of memory growth pattern scores for the applications, and a ranked list of percentage of memory usage above the baseline of the application for each application. The prediction engine periodically updates and sorts each of the lists, and applies a threshold to identify applications exhibiting behavior patterns such that they applications appear at the top of all of the lists. For example, when an application appears in the top n-positions (e.g., top five positions, top 10 positions, top 20 positions, etc.) of every list, the prediction engine identifies the application as potentially experiencing a memory leak Adjusting the n-value makes the prediction engine more or less sensitive. Adjusting the n-value affects two types of sensitivity that, for example, a network administrator may desire to balance for the priorities of the network (e.g., network 108). Increasing the n-value decreases the accuracy-based sensitivity (also referred to as "accuracy sensitivity") because a greater number of candidate processes leads to more possibilities of false positives. Conversely, when the n-value is small, eventually a process experiencing a memory leak will climb up in all the lists at the top positions, increasing the accuracy sensitivity. However, this may be slower to detect a possible memory leak. Increasing the n-value will improve the time based sensitivity (also referred to as "time sensitivity") because the more the number of processes as candidate processes, the less time a process will take to appear in top n-ranks of all the lists. For example, when a process with a legitimate requirement of memory might appear in other lists but in the memory growth pattern ranking it will be low since memory growth pattern will be incremented only once. Increasing the n-value possibility increases the possibility that a process will also appear in all the list. Thus, increasing accuracy sensitivity may reduce time sensitivity and vice versa. An administrator may balance the need for accuracy sensitivity with time sensitivity and the balance may change as circumstances in the network change (e.g., the administrator may know a process is experiencing a memory leak and may change the n-value temporarily to help identify the problematic process, etc.).

Because ameliorating the memory leak can cause disruption to functions provided by the application, the prediction engine further analyzes the memory usage of the identified user application against confirmation criteria to determine whether the user application is actually experiencing a memory leak. For example, the prediction engine may flag the application for further action when the current memory usage of the application is a threshold percentage (e.g., 50%, 100%, etc.) above the application's baseline memory usage and the current memory usage of the application is a threshold percentage (e.g., 10%, 20%, etc.) of total available system memory. This safeguards against false positives.

When the memory leak detection for an application is confirmed, the prediction engine may be configured to take one or more actions in response. In some examples, the prediction engine produces a memory alert that may be logged, trigger a Simple Network Management Protocol (SNMP) trap, and/or prompt an automatic or semi-automatic action by the network device to ameliorate the memory leak. For example, an administrator may configure a set of rules to take automatic action, such a terminating and re-instantiating the application, in response to the memory alert. In such a manner, the disclosed techniques improved the operation of the network device by facilitating proactive handling of memory leaks before the memory leaks cause a system failure.

FIG. 1 is a block diagram illustrating an example network environment in which a network includes a network device configured to detect memory leaks in accordance with techniques described in this disclosure. For purposes of example, the principles of the invention are described with respect to a simplified network environment 100 of FIG. 1 in which a network device 102 (sometimes referred to as a "core router") communicates with edge routers 104A and 104B (collectively "edge routers 104") to provide customer networks 106A-106C (collectively "customer networks 106") with access to network 108. Network 108 may be, for example, a service provider network or a cloud computing network. While the techniques disclosed herein are described in terms of the network device 102 and edge routers 104, the techniques may be used on other device that provides a user space in which a user may instantiate customer software components that use the virtual memory of the device, such as servers, data center server, and/or other types of network appliances like routers, switches, and/or controllers. The router 102 may exchange routing information with the edge routers 104 and/or controller 112 in order to maintain an accurate representation of the topology of the network environment 100. As described below, the network device 102 may consist of a plurality of cooperative routing components operating as a single node within the service provider network 108. The network device 102 includes a chassis (not shown in FIG. 1) that couples various internal routing components (e.g., line cards, switching fabric cards, a routing engine card, etc.) together.

Although not illustrated, the network 108 may be coupled to one or more networks administered by other providers, and may thus form part of a large-scale public network infrastructure, e.g., the Internet. Consequently, the customer networks 106 may be viewed as edge networks of the Internet. The network 108 may provide computing devices within the customer networks 106 with access to the Internet, and may allow the computing devices within the customer networks 106 to communicate with each other. In another example, the service provider network 108 may provide network services within the core of the Internet. As another example, the network 108 may provide services (e.g., cloud computing services, etc.) to the computing devices with the customer networks 106. In either case, the network 108 may include a variety of network devices (not shown) other than the router 102 and the edge routers 104, such as additional routers, switches, servers, or other devices.

In the illustrated example, the edge router 104A is coupled to the customer network 106A via access link 110A, and the edge router 104B is coupled to the customer networks 106B and 106C via additional access links 110B and 110C. The customer networks 106 may be networks for geographically separated sites of an enterprise. The customer networks 106 may include one or more computing devices (not shown), such as personal computers, laptop computers, handheld computers, workstations, servers, switches, printers, customer data centers or other devices. The configuration of the network environment 100 illustrated in FIG. 1 is merely an example. The service provider network 108 may be coupled to any number of the customer networks 106. Nonetheless, for ease of description, only an example number of customer networks 106A-106C are illustrated in FIG. 1. Many different types of networks beside networks 108 may employ an instance of the router 102, including customer/enterprise networks, transport networks, aggregation, or access networks, and so forth. Network traffic may flow, for example, from one customer network 106A to another customer network 106C through network device 102.

The network device 102 and the edge routers 104 include components that are responsible for the flow of packets through the device. These components may, from time to time, drop packets when certain criteria are met or due to underlying issues (such as, a misconfiguration, a coding error, etc.). For examples, the network device 102 and the edge routers 104 may include PFEs with interface cards with input interfaces (IIFs) and output interfaces (OIFs) that include filters. In such an example, the one or more contents of the packet (e.g., the header of the packet) meet the filtering criteria, the IIF or OIF may discard the packet. As another example, the source or destination in the header of the packet may be misformatted or may not be associated with an entry on the forwarding table. In such examples, the processor may discard the packet because a next hop cannot be determined. When a component discards a packet, the component encapsulates the dropped packet in a sample frame (e.g., including an exception code and the nexthop of the dropped packet, etc.). The packet is forwarded to a traffic monitor 114. In some examples, the PFE replaces the packet's current nexthop with a punt nexthop that directs the packet to the traffic monitor 114.

In the illustrated example, service provider network 108 includes a controller 112. In some examples, controller 112 may comprises software-defined networking controller. Controller 112 may monitor service provider network 108 and provide an interface for administrators to configure and/or monitor devices within service provider network 108 (e.g., network device 102, edge routers 104, etc.). In some examples, controller 112 may perform diagnostic functions and display health of network 108 in a graphical user interface to facilitate maintenance of network 108. In other examples, controller 112 may advertise the topology of network 108 and/or perform path computation based on the topology of network 108 and advertise routing updates to the devices within network 108. Controller 112 may, for example, provide an interface in which to response to alerts (e.g., alerts cause by memory leaks, etc.) and define rules to that define automatic or semi-automatic action in response tailored to specific types of alerts. The rules may cause, for example, devices within service provider network 108 (e.g., network device 102, edge routers 104, etc.) to terminate an application in response to an alert indicative that application is experiencing a memory leak.

In the illustrated example, one or more of network device 102 and edge routers 104 include a memory monitor 114. Memory monitor 114 is a script, process and/or software daemon that, in some examples, operates within a user space or kernel space of network devices 102 and edge routers 104 and makes system calls to kernels of network devices 102 and edge routers 104. Memory monitors 114 monitor usage of virtual memory by software applications operating in user space of the respective network devices 102 and edge routers 104. As described below, each memory monitor 114 characterizes the usage of virtual memory for each application to determine a virtual memory baseline and a virtual minimum memory growth. Based on this characterization, memory monitor 114 predicts whether an application is experiencing a memory leak. Memory monitor 114 applies confirmation criteria to virtual memory usage of the suspected application(s). For suspected applications for which the confirmation criteria are satisfied, memory monitor 114 may generate a memory alert. In some examples, the memory alert may be transmitted to controller 112 for further action. Additionally, in some example, memory manager 114 may take automatic action to ameliorate the effects of the memory leak.

Figure 2:
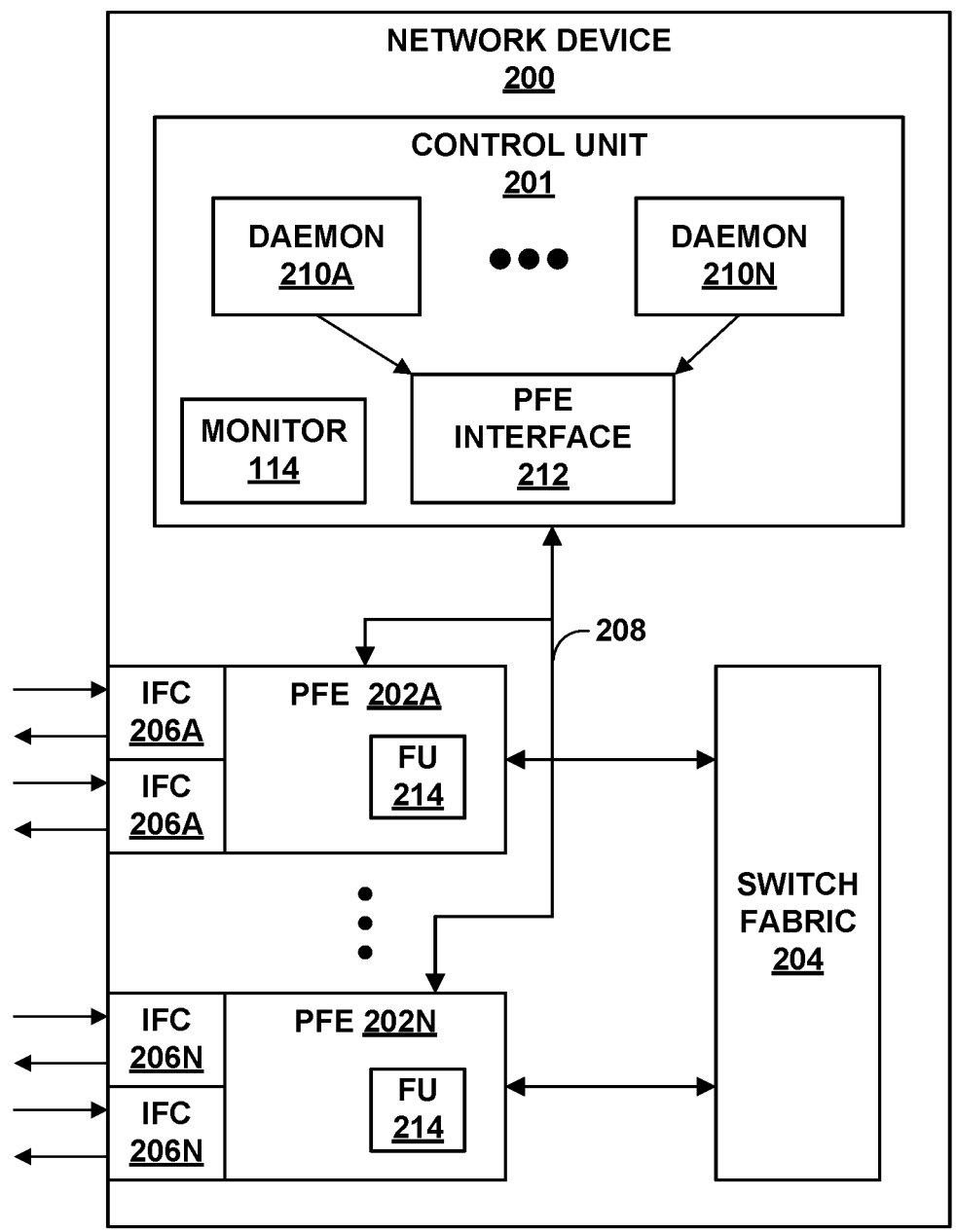
FIG. 2 is a block diagram illustrating an example network device that includes a memory monitor operating in accordance with principles described in this disclosure.

FIG. 2 is a block diagram illustrating an example network device that includes a memory monitor operating in accordance with principles described in this disclosure. Network device 102 may comprise a router such as a provider edge or customer edge router, a core router, or another type of network device, such as a switch.

In this example, network device 200 includes a control unit 201 that provides control plane functionality for the device. Networked device 200 is an example of network device 102 and edge routers 104. Network device 200 also includes a plurality of forwarding components in the form of example packet forwarding engines 202A-202N ("PFEs 202") and a switch fabric 204 that together provide a data plane for forwarding network traffic. PFEs 202 receive and send data packets via interfaces of interface cards 206A-206N ("IFCs 206") each associated with a respective one of PFEs 202. Each of PFEs 202 and its associated ones of IFCs 206 may reside on a separate line card for network device 102 (not shown). Example line cards include flexible programmable integrated circuit (PIC) concentrators (PFCs), dense port concentrators (DPCs), and modular port concentrators (MPCs). Each of IFCs 206 may include interfaces for various combinations of layer two (L2) technologies, including Ethernet, Gigabit Ethernet (GigE), and Synchronous Optical Networking (SONET) interfaces. In various aspects, each of PFEs 20 may comprise more or fewer IFCs. Switch fabric 204 provides a high-speed interconnect for forwarding incoming data packets to the selected one of PFEs 202 for output over a network.

Control unit 201 is connected to each of PFEs 202 by internal communication link 208. Internal communication link 208 may comprise a 100 Mbps Ethernet connection, for instance. Daemons 210A-210N ("daemons 210") executed by control unit 201 are user-level processes that run network management software, execute routing protocols to communicate with peer routing devices, maintain and update one or more routing tables, and create one or more forwarding tables for installation to PFEs 202, among other functions. Daemons 210 may include applications installed on network device 200 by administrators to provide additionally functionality. For example, these user applications may supplement route selection, firewall filters and policers, and/or flow monitoring, etc. Memory monitor 114 of FIG. 1 is an example of daemons 210 executed by control unit 201. Daemons 210 are communicatively couple to PFEs 202 via a PFE interface 212 within control unit 201.

Control unit 201 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 12 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

PFEs 202 process packets by performing a series of operations on each packet over respective internal packet forwarding paths as the packets traverse the internal architecture of network device 200. Operations may be performed, for example, on each packet by any of a corresponding ingress interface, an ingress PFE 202, an egress PFE 202, an egress interface or other components of network device 200 to which the packet is directed prior to egress, such as one or more service cards. PFEs 202 each include hardware and/or software forwarding units (FUs) 214 that examine the contents of each packet (or another packet property, e.g., incoming interface) to make forwarding decisions, apply filters, and/or perform accounting, management, traffic analysis, and/or load balancing. In one example, each of PFEs 202 arranges forwarding units 214 as next hop data that can be chained together as a series of "hops" along an internal packet forwarding path for the network device. The result of packet processing determines the manner in which a packet is forwarded or otherwise processed by PFEs 202 from its input interface on one of IFCs 206 to its output interface on one of IFCs 206.

Forwarding units 214 include a lookup data structure (sometimes referred to as a "forwarding table") to perform lookup operations, such as a tree (or trie) search, a table (or index) search, a filter determination and application, or a rate limiter determination and application. Lookup operations locate a routing entry that matches packet contents or another property of the packet or packet flow, such as the inbound interface of the packet. As described below, forwarding units 214 also include a consistency data structure (sometime referred to as a "consistency table") to store attributes of the routing entries to facilitate generating consistency information for a consistency check. In some examples, the forwarding table and the consistency table are stored in separate data structures. Alternatively, in some examples, the forwarding table and the consistency table may be stored in the same data structure.

In the illustrated example, control unit 201 includes memory monitor 114. Memory monitor 114 is a script, process and/or software daemon that, in some examples, operates within a user space or kernel space of control unit 201 and makes system calls to the kernel. Memory monitors 114 monitor usage of virtual memory by software applications operating in user space of the control unit 201. As described below, the memory monitor 114 characterizes the usage of virtual memory for each application to determine a virtual memory baseline and a virtual minimum memory growth. Based on this characterization, memory monitor 114 predicts whether an application is experiencing a memory leak. Memory monitor 114 applies confirmation criteria to virtual memory usage of the suspected application(s). For suspected applications for which the confirmation criteria are satisfied, memory monitor 114 may generate a memory alert. In some examples, the memory alert may be transmitted to an external controller (e.g., controller 112 of FIG. 1) for further action. Additionally, in some example, memory manager 114 may take automatic action to ameliorate the effects of the memory leak.

Figure 3:
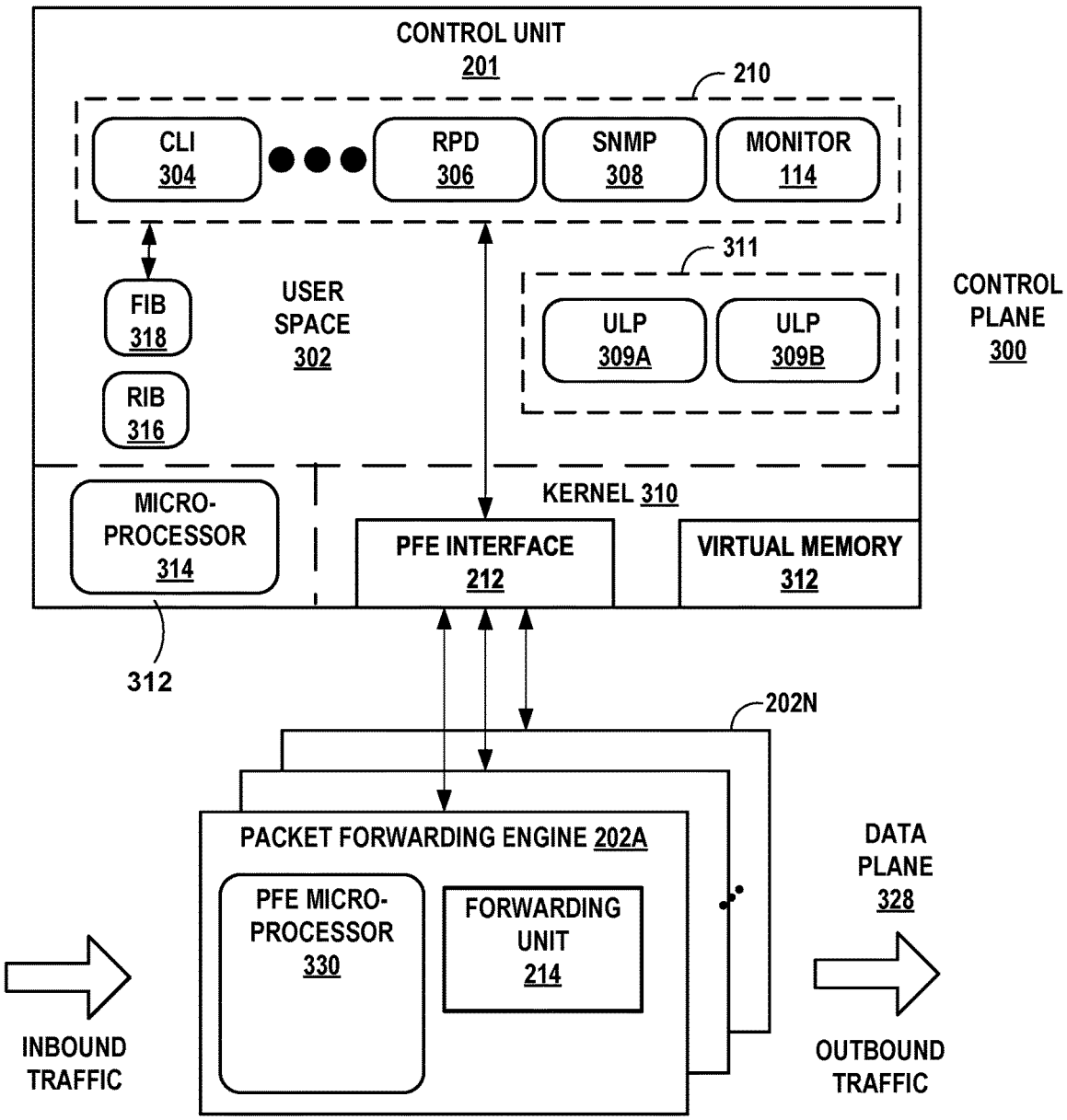
FIG. 3 is a block diagram illustrating an example of the network device of FIGS. 1 and 2 in further detail

FIG. 3 is a block diagram illustrating an example embodiment of network device 200 of FIG. 2 in further detail. In this example, control unit 201 provides a control plane 300 operating environment for execution of various user-level daemons 210 executing in user space 302. Daemons 210 may include command-line interface daemon 304 ("CLI 304"), routing protocol daemon 306 ("RPD 306"), Simple Network Management Protocol daemon 308 ("SNMP 308"), and, memory monitor 114 ("monitor 114"). In this respect, control plane 300 may provide routing plane, service plane, and management plane functionality for network device 102. Various instances of control unit 201 may include additional daemons 210 not shown in FIG. 3 that perform other control, management, or service plane functionality and/or drive and otherwise manage data plane functionality for network device 102. In the illustrated example, user-level processes 309A and 309B (collectively "user-level processes 309" or "ULP 309") operate in a user-level processes 309. User-level processes 309 may in installed by an administrator (e.g., via controller 112 of FIG. 1) to provide additional functionality to network device 200. These user-level processes 309 may, for example, supplement functionality of daemons 210.

Daemons 210 operate over and interact with kernel 310, which provides a run-time operating environment 311 for user-level processes 309. In some examples, daemons 210 and user-level processes 309 may operate in run-time operating environment 311. Kernel 310 may comprise, for example, a UNIX operating system derivative such as Linux or Berkeley Software Distribution (BSD). Kernel 310 offers libraries and drivers by which daemons 210 may interact with the underlying system. Kernel 310 also provides virtual memory 312 that is accessible by daemons 210. Virtual memory 312 is a limited system resource. PFE interface 212 of kernel 310 comprises a kernel-level library by which daemons 210 and other user-level processes or user-level libraries may interact with PFEs 202. PFE interface 212 may include, for example, a sockets library for communicating with PFEs 202 over dedicated network links.

Hardware environment 312 of control unit 201 comprises microprocessor 314 that executes program instructions loaded into physical memory (not shown in FIG. 3) from storage (also not shown in FIG. 3) in order to execute the software stack, including both kernel 310 and user space 302, of control unit 201. Microprocessor 314 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein. RPD 306 executes one or more interior and/or exterior routing protocols to exchange routing information with other network devices and store received routing information in routing information base 316 ("RIB 316"). RIB 316 may include information defining a topology of a network, including one or more routing tables and/or link-state databases. RPD 306 resolves the topology defined by routing information in RIB 316 to select or determine one or more active routes through the network and then installs these routes to forwarding information base 318 ("FIB 42"). As used here, the information in the RIB 216 used to define each route is referred to as a "routing entry." Typically, RPD 306 generates FIB 318 in the form of a radix or other lookup tree to map packet information (e.g., header information having destination information and/or a label stack) to next hops and ultimately to interface ports of interface cards associated with respective PFEs 202.

Command line interface daemon 304 ("CLI 304") provides a shell by which an administrator or other management entity may modify the configuration of network device 102 using text-based commands. Simple Network Management Protocol daemon 308 ("SNMP 308") comprises an SNMP agent that receives SNMP commands from a management entity to set and retrieve configuration and management information for network device 102. Using CLI 304 and SNMP 308, management entities may enable/disable and configure services, install routes, enable/disable, and configure rate limiters, and configure interfaces, for example. RPD 306, CLI 304, and SNMP 308 may configure data plane 328 to implement configured services, and otherwise add/modify/delete routes.

Memory monitor 114 monitors usage of virtual memory by user-level processes 309 operating in run-time operating environment 311. Memory monitor 114 performs system calls to kernel 310 to retrieve current usage of virtual memory 312 by user-level processes 309. For each user-level processes 309, memory monitor 114 establishes a memory usage baseline that characterizes the typical amount of memory used by the user-level process 309. To establish the baseline, memory monitor 114 may retrieve the memory usage of user-level processes 309 periodically (e.g., every day at a certain time, every six hours, etc.) and/or in response to an event (e.g., after a settling time following a reboot of network device 200, etc.) (sometimes referred to as the "baseline sample"). For example, memory monitor 114 may set the baseline virtual memory usage for user-level processes 309A to 70 MB. For each user-level processes 309, memory monitor 114 also establishes a minimum memory growth. The minimum memory growth is indicative of an increase above the baseline memory monitor 114 expects during normal operation of a user-level processes 309 that is not experiencing a memory leak. For example, memory monitor 114 may set the minimum memory growth for user-level processes 309A to be 35 MB. Although shown as executing in user space 302 for purposes of example, memory monitor 114 may execute in kernel space 310, user space 302, or operate in a distributed manner such that portions of the memory monitor execute in both operating locations.

Based on the memory growth pattern baseline and minimum memory growth, memory monitor 114 tracks a memory growth pattern score for each user-level processes 309. Initially, the memory growth pattern baseline for each user-level process 309 is its baseline virtual memory usage. The memory growth pattern score is indicative of whether a particular user-level processes 309 is increasingly using more memory over time. Periodically (e.g., every minute, every five minutes, every ten minutes, etc.), memory monitor 114 retrieves the virtual memory usage of each user-level processes 309 (sometimes referred to as the "update sample"). Memory monitor 114 increases the memory growth pattern score of a user-level process 309 when the virtual memory usage of user-level process 309 exceeds the memory growth pattern baseline by minimum memory growth. In some examples, memory monitor 114 increases the memory growth pattern score per minimum memory growth that user-level process 309 exceeds the memory growth pattern baseline value. For example, if the memory growth pattern baseline value is 70 MB, the minimum memory growth is 35 MB, memory monitor 114 may increase the memory growth pattern score by one when the current memory usage is 110 MB (e.g., greater than one minimum memory growth), and increase the memory growth pattern score by two when the current memory usage is 145 MB (e.g., greater than two minimum memory growths). In such a manner, memory growth pattern scores user-level processes 309 operating without memory leaks may increase slowly and/or stabilize while user-level processes 309 experiencing memory leaks will continue to grow at an increasing pace. For example, at a first time, for user-level process 'p', the current virtual memory usage may cause increase the memory growth pattern and an update to the memory growth pattern baseline to reflect the increased memory usage. However, at a second, subsequent time, the current virtual memory usage may be less than memory growth pattern baseline. In this example, the memory growth pattern baseline is not reset to the lower value of current memory usage. Thus, the memory growth pattern score does not increase until the process 'p' shows a growth greater than or equal to the minimum memory growth above the increased memory growth pattern baseline. Thus, for temporary increases in memory that result in proper releases in memory, the growth pattern score will eventually level off for process 'p'.

To predict that one of user-level processes 309 is experiencing a memory leak, memory monitor 114 maintains multiple ranked list, where each list comprises a ranked list of identifiers for each user-level process 309 operating on the network device. Moreover, memory monitor 114 maintains each list to track a different memory usage metric for the set of user-level processes 309. For example, memory monitor 114 may maintain, in real-time or pseudo real-time, a ranked list of current memory usage (e.g., based on the most recent update sample), a ranked list of memory growth pattern scores, and a ranked list of percentage of memory usage above the baseline of the application. When an application appears in one of the top n-positions (e.g., top 5 positions, top 10 positions, top 20 positions, etc.) of each list, memory monitor 114 flags that user-level process 309 as potentially experiencing a memory leak. Memory monitor 114 further analyzes the memory usage of the flagged user-level process 309 against confirmation criteria to determine whether the user application is actually experiencing a memory leak. For example, memory monitor 114 may determine that a user-level process 309 is experiencing a memory leak when the current memory usage of the user-level process 309 is a threshold percentage (e.g., 50%, 100%, etc.) above the baseline virtual memory usage of the user-level process 309 and the current memory usage of the user-level process 309 is a threshold percentage (e.g., 10%, 20%, etc.) of total available system memory (e.g., system random access memory (RAM)). When memory monitor 114 determines user-level process 309 is experiencing a memory leak, memory monitor 114 generates an alert.

PFEs 202 implement data plane 328 (also known as a "forwarding plane") functionality to handle packet processing from ingress interfaces on which packets are received to egress interfaces to which packets are sent. Data plane 328 determines data packet forwarding through network device 102, applies services, rate limits packet flows, filters packets, and otherwise processes the packets using forwarding table 320 installed by control plane 300 to data plane 328. While FIG. 3 illustrates only PFE 202A in detail, each of PFEs 202 comprises similar components that perform substantially similar functionality.

PFE 202s bind actions to be performed on packets received by the PFEs to identification of one or more properties of the packets. That is, upon identifying certain packet properties, PFEs 202 perform the action bound to the properties. Packet properties may include packet metadata such as a particular packet's ingress interface or egress interface (as determined by the PFEs) as well as information carried by the packet and packet header, such as packet header fields, destination route prefixes, layer four (L4) or Transport Layer protocol destination ports, and the packet payload. Actions bound to packet characteristics may include count, discard, forward to a specified next-hop or interface, filter, sample, rate limit, and Quality of Service (QoS) marking, differential services (DiffServ), load balance, intrusion detection and prevention, L2 class of service (CoS), and L2 or L2 Virtual Private Network (L2VPN) switching. PFE microprocessor 330 may execute a microkernel to provide an operating environment for processing packets through the forwarding unit 214.

Figure 4:
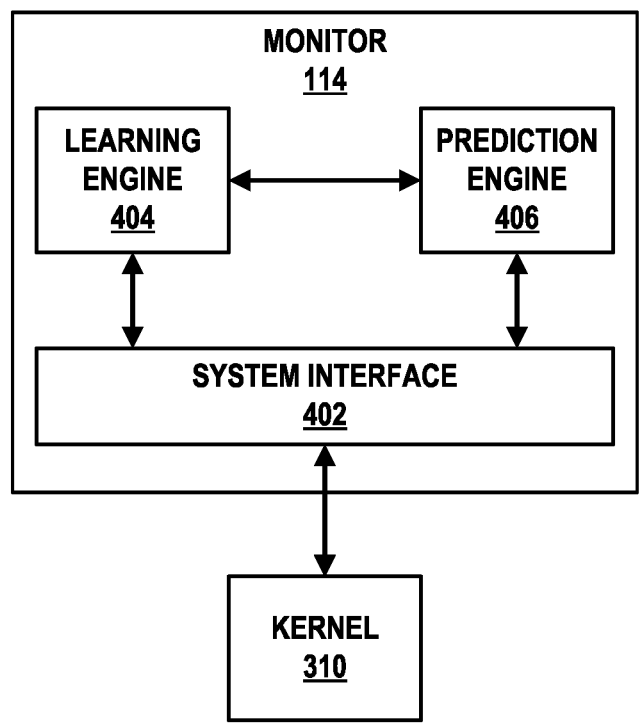
FIG. 4 is a conceptual diagram illustrating a memory monitor to detect memory leaks in applications operating on the network device.

FIG. 4 is a block diagram illustrating one example implementation of memory monitor 114 configured to detect memory leaks in software components operating on the network device (e.g., network device 200 of FIGS. 2 and 3). In the illustrated example, memory monitor 114 includes system interface 402, learning engine 404, and prediction engine 406. System interface 402 performs system calls to request system level information from kernel 310 for software components (e.g., user level processes 309 of FIG. 3, etc.) operating within user space 302 of network device 200. Learning engine 404 and prediction engine 406 request memory usage of user level processes 309 via system interface 402.

Learning engine 404 characterizes memory usage of user level processes 309 based on real-time and historical memory patterns. For each user level processes 309, learning engine 404 establishes a baseline memory usage (BASE USE). The baseline memory usage is indicative of a typical amount of memory that the particular user level process 309 consumes to facilitate detecting when that user level process 309 is consuming an atypical amount of memory. Learning engine 404 may establish the base line memory usage when typical memory usage is expected. In some examples, learning engine 404 may sample memory usage a threshold time after network device 200 is reset. The threshold time is set to allow user level processes 309 initialize and operate at a steady state. In some examples, learning engine 404 may sample memory usage at a certain time of day (e.g., 1 A.M., 2 A.M., etc.). Additionally, for each user level processes 309, learning engine 404 establishes a minimum memory growth (MMG) that is indicative of typical memory usage increases. The minimum memory growth establishes a value used to determine whether or not the memory growth pattern score should be increased for that process. In some examples, the minimum memory growth may be set by a standard factor (e.g., 25% of baseline memory usage, 50% of baseline memory usage, etc.).

Learning engine 404 monitors current memory usage (CSZ) at a configured time interval (e.g., every minute, every five minutes, every ten minutes etc.). At every time interval, learning engine 404 monitors memory usage for indicators of potential memory leaks. Learning engine 404 may update a memory growth pattern score (MGP) that tracks the growth pattern of memory usage by each user level process 309. Learning engine 404 compares the current memory usage to a memory growth pattern baseline (MGP_BASE). Initially, the memory growth pattern memory baseline is the baseline memory usage. When the current memory usage is a threshold amount (e.g., the minimum memory growth, etc.), learning engine 404 determines that memory usage growth has occurred. Leaning engine 404 increments memory growth pattern score and sets the memory growth pattern memory usage to be the current memory usage. In such a manner, as total memory usage increases, the memory growth pattern score also increases. The memory growth pattern score facilitates separating user level processes 309 that experience expected memory usage increases from user level processes 309 that are experiencing memory leaks in addition to expected memory usage increases. For example, the memory growth score of a user level process 309 that experiences expected memory usage may increase from time to time, but may reach a steady state memory growth pattern score. On the other hand, the memory growth score of a user level processes 309 that experiences expected memory usage increases may continue to increase over time. In some examples, learning engine 404 may update the memory growth pattern memory usage and memory growth pattern score by the following:

```
if (CSZ − MGP_BASE > MMG)
{
    MGP++
    MGP_BASE = CSZ
}
```

Prediction engine 406 uses memory usage metrics, such as the memory growth pattern score, to detect whether a user level processes 309 is experiencing a memory leak. Prediction engine 406 may first nominate a user level process 309 as likely experiencing a memory leak. Prediction engine 406 may then apply one or more confirmation criteria (such as percentage of total available system memory (RAM) used, etc.) to determine whether a user level processes 309 is more likely than not experiencing a memory leak. The confirmation criteria may help to avoid false positive predictions of memory leaks. To nominate a user level processes 309 (i.e., identify a process as a candidate for a software process experiencing a memory leak), prediction engine 406 maintains multiple list of user level processes where each list ranks the set of user level processes 309 by a different memory usage metric. For example, prediction engine 406 may maintain a ranked list of memory growth pattern scores, a ranked list of total virtual memory usage, and a ranked list of percentage of memory growth pattern baseline compared to the baseline virtual memory usage, etc. Prediction engine updates the ranked lists when the current memory usage values are sampled, and the memory growth pattern score is updated by learning engine 404. Prediction engine 406 nominates a user level program 309 when that user level program 309 appears in the top N positions in each ranked list. For example, prediction engine 406 may nominate a user level process 309 when that user level program 309 appears in the top five positions in each ranked list. The number of top positions (N) may be configurable to change the time sensitivity and the accuracy sensitivity. In some examples, prediction engine 406 may only nominate user level processes 309 when a threshold amount (e.g., 50%, 60%, 75%, etc.) of total available memory is being used.

When a user level process 309 is nominated, prediction engine 406 applies one or more confirmation criteria based on memory usage metrics. The confirmation criteria are indicative of whether the nominated user level process is using memory in such a way that a memory leak by the nominated user level process is probable. In some examples, confirmation criteria include whether the current memory usage is a threshold percentage increase (e.g., 50%, 75%, 100%, etc.) from the baseline memory usage. In some examples, confirmation criteria include whether the current memory usage has increased by a threshold percent (e.g., 10%, 15%, etc.) of total available system memory. In some examples, prediction engine 406 may predict that a user level process is experiencing a memory leak when the nominated user level process meets one or more of the criteria. In some examples, the number of criteria necessary to predict that a user level process is experiencing a memory leak may be changed to change the sensitivity of the prediction engine 406 (e.g., more criteria makes the prediction engine 406 less likely to make a wrong prediction, etc.).

Prediction engine 406 may provide the prediction to one or more of daemons 210 and/or other processes monitoring performance of network device 200. For example, Prediction engine 406 may provide the prediction to (a) SNMP 308 to trigger a SNMP trap. (b) a system log to log the occurrence of the memory leak for further analysis, and/or (c) an external network appliance (e.g. controller 112 of FIG. 1) to trigger an alert and/or automatic ameliorative response, etc. In such a manner, the monitor 114 may detect and respond to memory leaks before it disrupts operation of network device 200.

Figure 5:
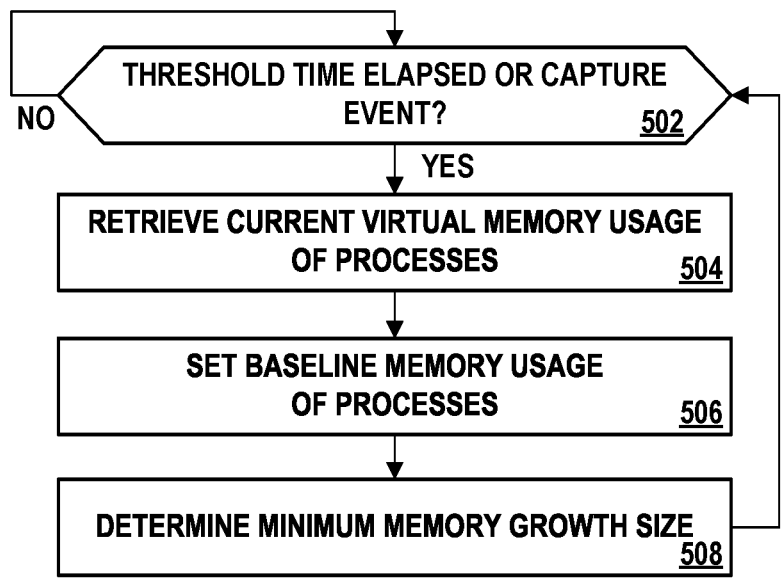
FIG. 5 is a flowchart of an example method to characterize memory usage of applications operating on the network device.

FIG. 5 is a flowchart of an example method to characterize memory usage of user level processes operating on network device 200. Initially, monitor 114 waits for a trigger, such as a threshold period of time (e.g., every 6 hours, every 24 hours, etc.) and/or a designated event (e.g., reset of network device 200, etc.) (502). The trigger may be configured to be when software components are likely exhibiting normal memory usage. In response to a trigger (YES at 502), monitor 114 retrieves (e.g., via a system call to kernel 310) current virtual memory usage for software objects (e.g., user level processes 309, etc.) operation on network device 200 (504). Monitor 114 sets the baseline memory usage of the processes using the retrieved current memory usage (506). Monitor determines minimum memory growth size (508). For example, the minimum memory growth interval size may be a percentage (e.g., 10%, 25%, 50%, etc.) of the baseline memory usage. In some examples, the minimum memory growth size may be a fixed value for all the processes on the network device. In some examples, the minimum memory growth interval size may be a configurable percentage, where lowering the percentage results in the memory growth pattern score being more sensitive to changes in memory usage.

Figure 6:
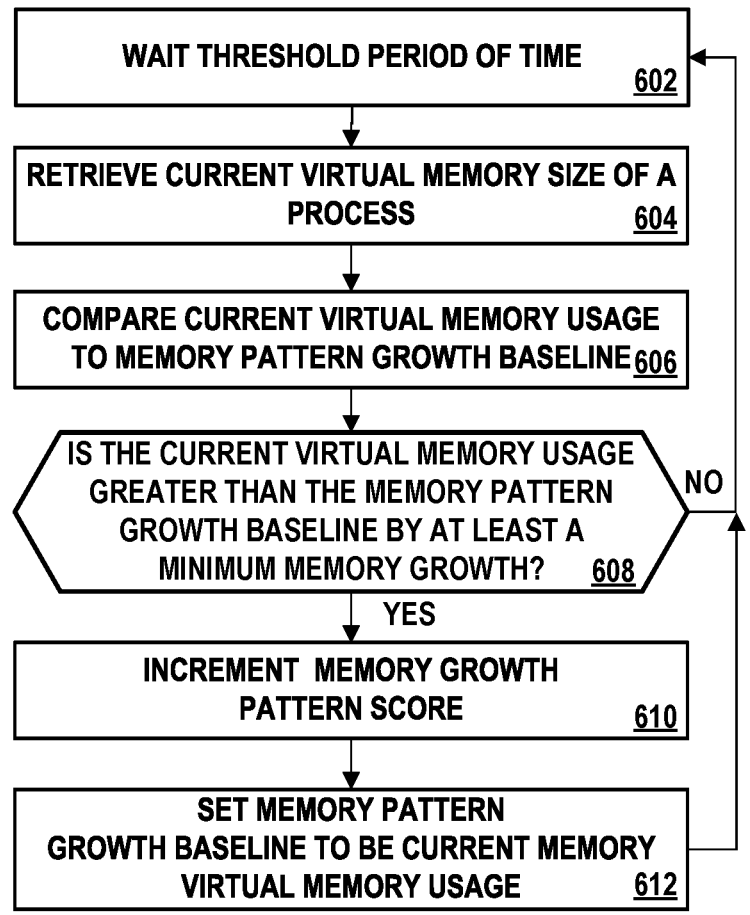
FIG. 6 is a flowchart of an example method to calculate a memory growth pattern score of applications operating on the network device.

FIG. 6 is a flowchart of an example method to calculate a memory growth pattern score of software components operating on network device 200. Initially, memory monitor 114 waits a threshold period of time (e.g., one minute, five minutes, ten minutes, etc.) (602). Monitor 114 retrieves (e.g., via a system call to kernel 310) current virtual memory usage for software components (e.g., user level processes 309, etc.) operating on network device 200 (604). For each software component, memory monitor 114 compares the current virtual memory usage to memory pattern growth baseline (606). Initially, the memory growth pattern baseline is the baseline memory usage of the software component. For each software component, memory monitor 114 determines whether the current virtual memory usage is greater than the memory growth pattern baseline by at least a minimum memory growth (608). When the current virtual memory usage is greater than the memory growth pattern baseline by at least a minimum memory growth (YES at 608), memory monitor 114 increments the memory growth pattern score for that software component (610). Memory monitor 114 sets the current virtual memory usage to be the memory growth pattern baseline (612). When the current virtual memory usage is not greater than the memory growth pattern baseline by at least a minimum memory growth (YES at 608), memory monitor 114 waits the threshold period of time (602).

Figure 7:
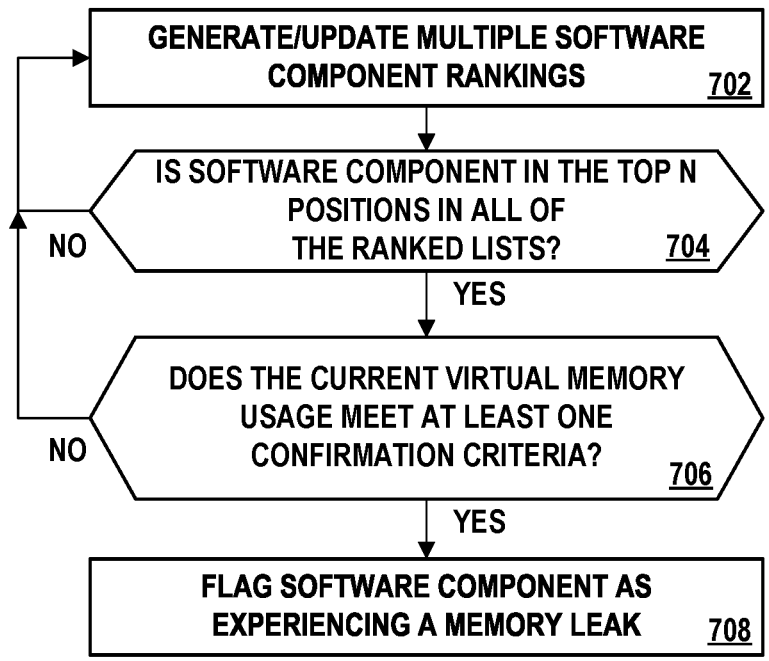
FIG. 7 is a flowchart of an example method to detect memory leaks of applications operating on the network device based on characterization of memory usage and the memory growth pattern score.

FIG. 7 is a flowchart of an example method to detect memory leaks of software components operating on the network device 200 based on characterization of memory usage and the memory growth pattern score. Initially, monitor 114 generates and/or updates multiple ranked lists that rank the software components being monitored using different memory usage criteria (702). Monitor 114 determine whether any software components being monitored in the top N positions in all of the ranked lists (704). When a software component is in the top N positions in all of the ranked lists (YES at 704), monitor 114 determines whether the current virtual memory usage meet at least one of the confirmation criteria (706). Otherwise, when software component is not in the top N positions in all of the ranked lists (NO at 704), monitor 114 updates the multiple ranked lists (702). When the current virtual memory usage meets at least one of the confirmation criteria (YES at 706), monitor 114 flags the software component as experiencing a memory leak (708). Otherwise, when the current virtual memory usage does not meet at least one of the confirmation criteria (No at 706), monitor 114 updates the multiple ranked lists (702).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

The invention claimed is:

1. A network device comprising:
   memory; and
   processing circuitry configured to:
   monitor a usage of the memory by a software component operating within the network device;
   periodically determine a memory growth pattern score for the software component based on the usage of the memory;
   identify whether the software component is experiencing a memory leak based on the memory growth pattern score for the software component and a ranked list of memory growth pattern scores for a plurality of software components operating within the network device;
   and
   based on identifying that the software component is experiencing the memory leak, generate an alert.

2. The network device of claim 1, wherein to monitor the usage of the memory by a software component, the processing circuitry is configured to determine a baseline virtual memory usage and a minimum memory growth.

3. The network device of claim 2, wherein to determine the memory growth pattern score, the processing circuitry is configured to:
   determine a current memory usage of the software component; and
   increment the memory growth pattern score when the current memory usage is greater than the baseline virtual memory usage plus the minimum memory growth.

4. The network device of claim 2, wherein to determine the baseline virtual memory usage, the processing circuitry is configured to determine a first memory usage of the software component in response to a restart event of the network device.

5. The network device of claim 1, wherein the processor is further configured to predict whether the user-level process is experiencing a memory leak based on a ranked list of the current memory usage.

6. The network device of claim 1, wherein the processor is further configured to predict whether the user-level process is experiencing a memory leak based on a ranked list of percentage of memory usage increase compared to baseline virtual memory usage.

7. The network device of claim 1, wherein the processor is further configured to apply confirmation criteria to current memory usage of the software component to confirm that the software component is experiencing the memory leak, wherein the confirmation criteria include determining whether the current memory usage is a threshold percentage increase compared to a baseline virtual memory usage.

8. The network device of claim 1, wherein the processor is further configured to apply confirmation criteria to current memory usage of the software component to confirm that the software component is experiencing the memory leak, wherein the confirmation criteria include determining whether the current memory usage is a threshold percentage of total available system memory of the network device.

9. The network device of claim 1, wherein the alert causes the network device to perform a remediation action.

10. The network device of claim 1, wherein the alert triggers at least one of a Simple Network Management Protocol trap or a telemetry push notification.

11. The network device of claim 1, wherein the processor is further configured to identify whether the user-level process is experiencing a memory leak when the growth pattern score for the software component appears in one of n top positions of the ranked list of memory growth pattern scores for a plurality of software components operating within the network device.

12. The network device of claim 1, wherein the processor is further configured to identify whether the user-level process is experiencing a memory leak when the growth pattern score for the software component appears in one of n top positions of the ranked list of memory growth pattern scores for a plurality of software components operating within the network device and when a current memory usage for the software component appears in one of n top positions of a ranked list of current memory usage for a plurality of software components operating within the network device.

13. A method comprising:
monitoring memory usage for a software component operating within a network device;
periodically determining a memory growth pattern score for the software component based on the characterization of the memory usage;
identifying whether the software component is experiencing a memory leak based on the memory growth pattern score for the software component and a ranked list of memory growth pattern scores for a plurality of software components operating within the network device; and
based on identifying the software component is experiencing the memory leak, generating an alert.

14. The method of claim 13, wherein monitoring the memory usage for the software component comprises determining a baseline virtual memory usage and a minimum memory growth.

15. The method of claim 14, wherein determining the memory growth pattern score comprises:
determining a current memory usage of the software component; and
incrementing the memory growth pattern score when the current memory usage is greater than the baseline virtual memory usage plus the minimum memory growth.

16. The method of claim 14, wherein determining the baseline virtual memory usage comprises determining a first memory usage of the software component in response to a restart event of the network device.

17. The method of claim 13, wherein identifying whether the software component is experiencing a memory leak is further based on a ranked list of the current memory usage.

18. The method of claim 13, wherein identifying whether the software component is experiencing a memory leak is further based on a ranked list of percentage of memory usage increase compared to baseline virtual memory usage.

19. The method of claim 13, further comprising applying confirmation criteria to current memory usage of the software component to confirm that the software component is experiencing the memory leak, wherein the confirmation criteria include at least one of determining whether the current memory usage is a threshold percentage increase compared to a baseline virtual memory usage or determining whether the current memory usage is a threshold percentage of total virtual memory of the network device.

20. A non-transitory computer readable medium comprising instructions that, when executed, cause a network device to:
monitor memory usage for a software component operating within a network device;
periodically determine a memory growth pattern score for the software component based on the characterization of the memory usage;
identify whether the software component is experiencing a memory leak based on the memory growth pattern score for the software component and a ranked list of memory growth pattern scores for a plurality of software components operating within the network device; and
based on identifying the software component is experiencing the memory leak, generating an alert.

* * * * *